May 2, 1944.   P. SYNEK   2,348,035
APPARATUS FOR MAKING BEADS
Filed Sept. 12, 1940   3 Sheets-Sheet 1

INVENTOR
PETER SYNEK
BY
A. Winburn
ATTORNEY

May 2, 1944. P. SYNEK 2,348,035
APPARATUS FOR MAKING BEADS
Filed Sept. 12, 1940  3 Sheets-Sheet 2
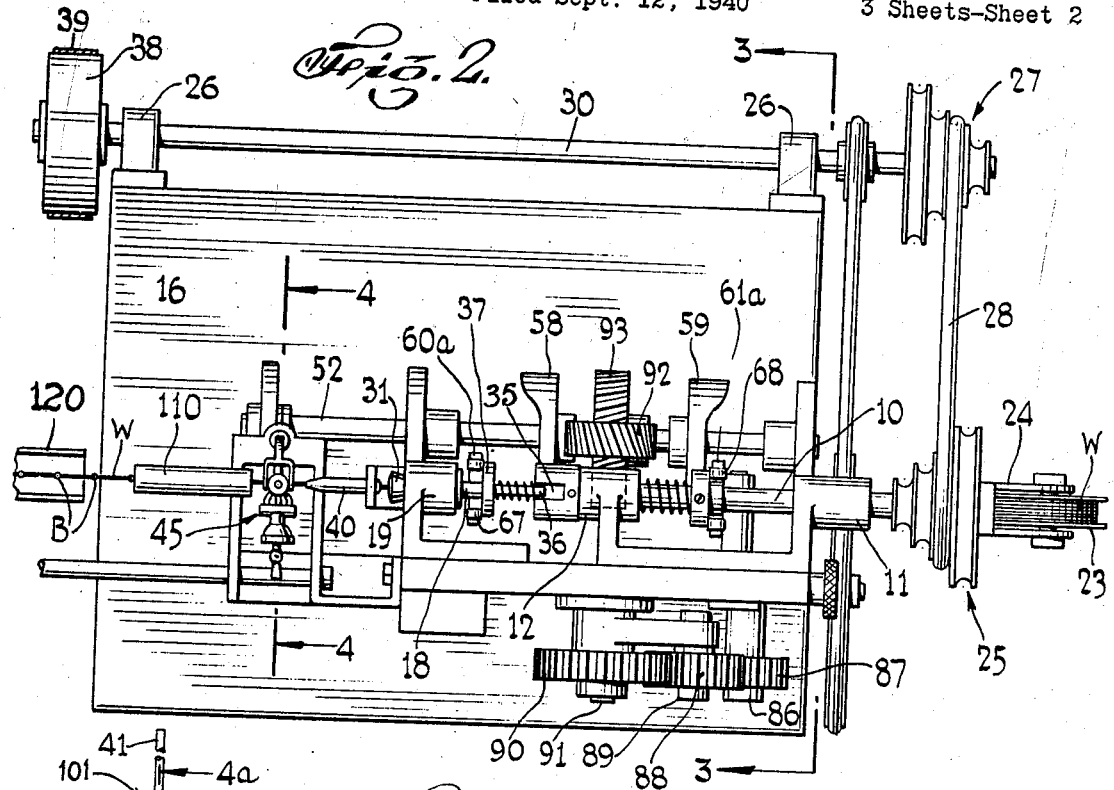
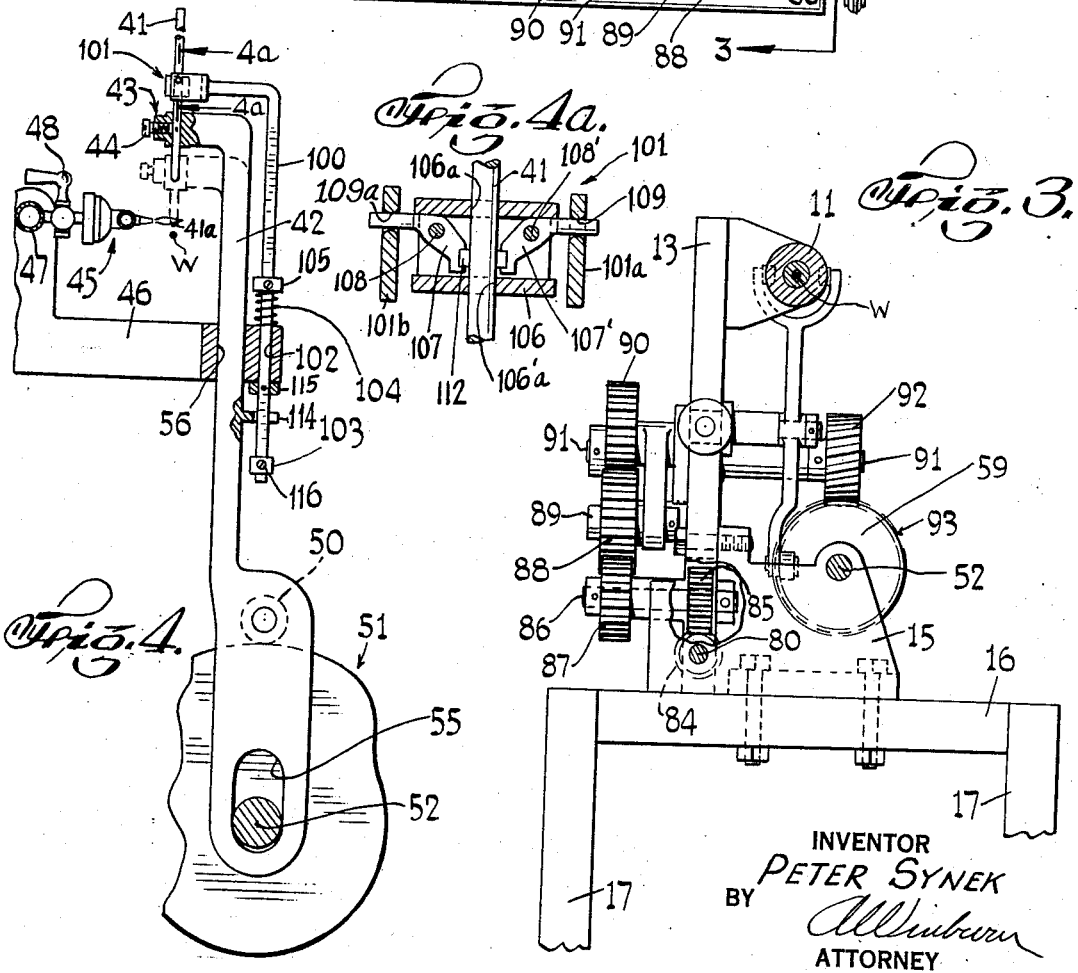
INVENTOR
PETER SYNEK
BY
ATTORNEY

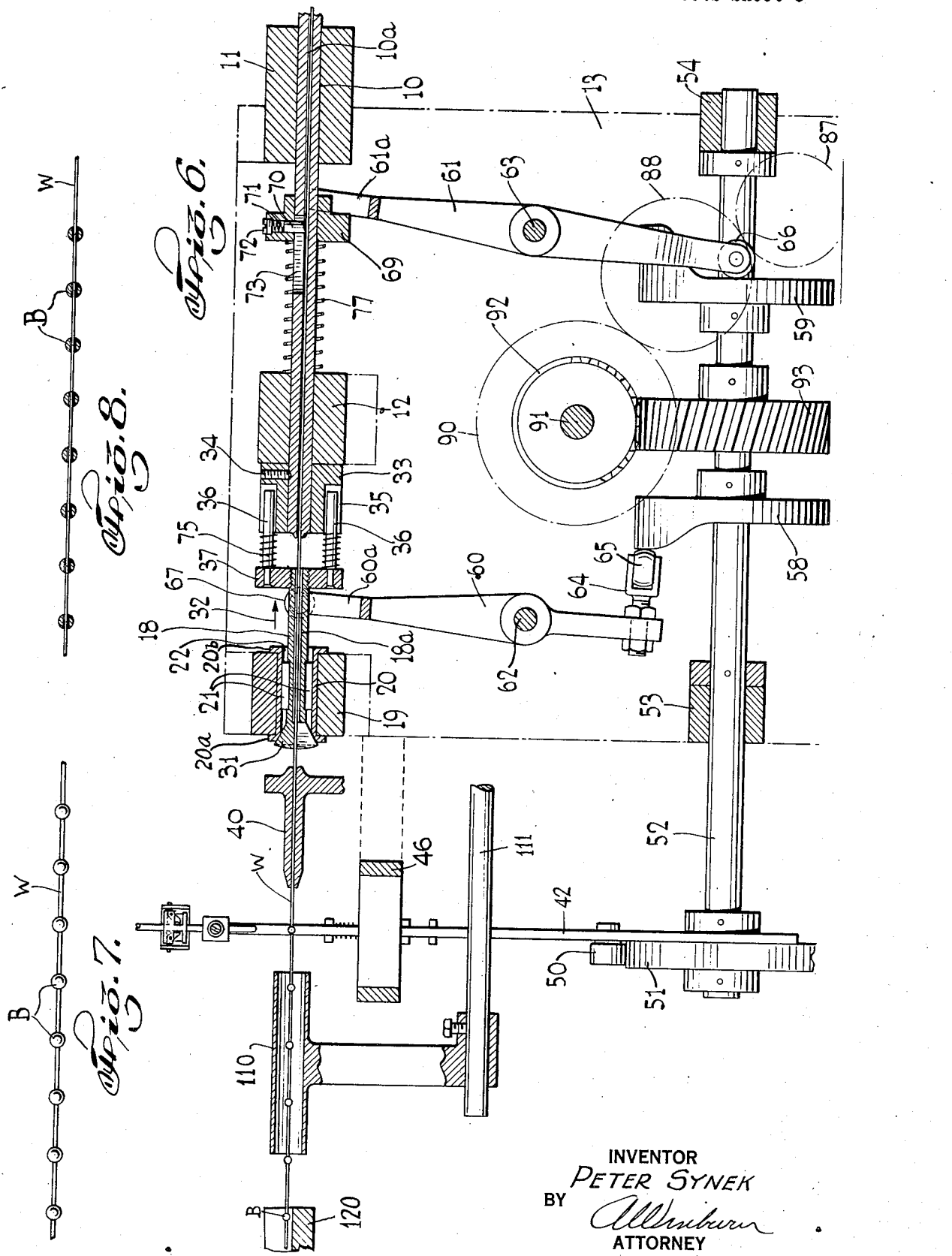

Patented May 2, 1944

2,348,035

UNITED STATES PATENT OFFICE 2,348,035

APPARATUS FOR MAKING BEADS

Peter Synek, Jackson Heights, N. Y.

Application September 12, 1940, Serial No. 356,478

7 Claims. (Cl. 49—7)

This invention relates generally to the making of beads. More particularly my invention is directed to an improved apparatus for making glass beads, or beads of other similar plastic materials.

One of the objects of my invention is to provide a highly improved apparatus for making glass or similar beads which shall be characterized by certain novel constructional features, whereby the beads may be relatively inexpensively manufactured and in a continuous process.

Still another object of my invention is to provide improved and novel apparatus for making beads of the character described which shall be so constructed and arranged as to be automatic in operation.

Other objects of my invention will become apparent in the following detailed description thereof.

In the accompanying drawings, in which is shown one of the various possible embodiments of my invention, Fig. 1 is a front elevational view of an apparatus for making glass beads or beads of similar materials, constructed in accordance with my invention, certain parts being in section and other parts broken away;

Fig. 2 is a top plan view thereof;

Fig. 3 is a cross-sectional view taken substantially on the line 3—3 of Fig. 2;

Fig. 4 is a cross sectional view taken substantially on the line 4—4 of Fig. 2;

Fig. 4a is an enlarged cross-sectional view taken substantially on the line 4a—4a of Fig. 4;

Fig. 6 is an enlarged elevational view, partly sectional, of a portion of the apparatus shown in Fig. 1;

Fig. 7 is an elevational view of a plurality of beads made in accordance with my invention; and Fig. 8 is a view similar to Fig. 7, but with the beads shown in section and illustrating a step in my process of making beads.

Figure 1:
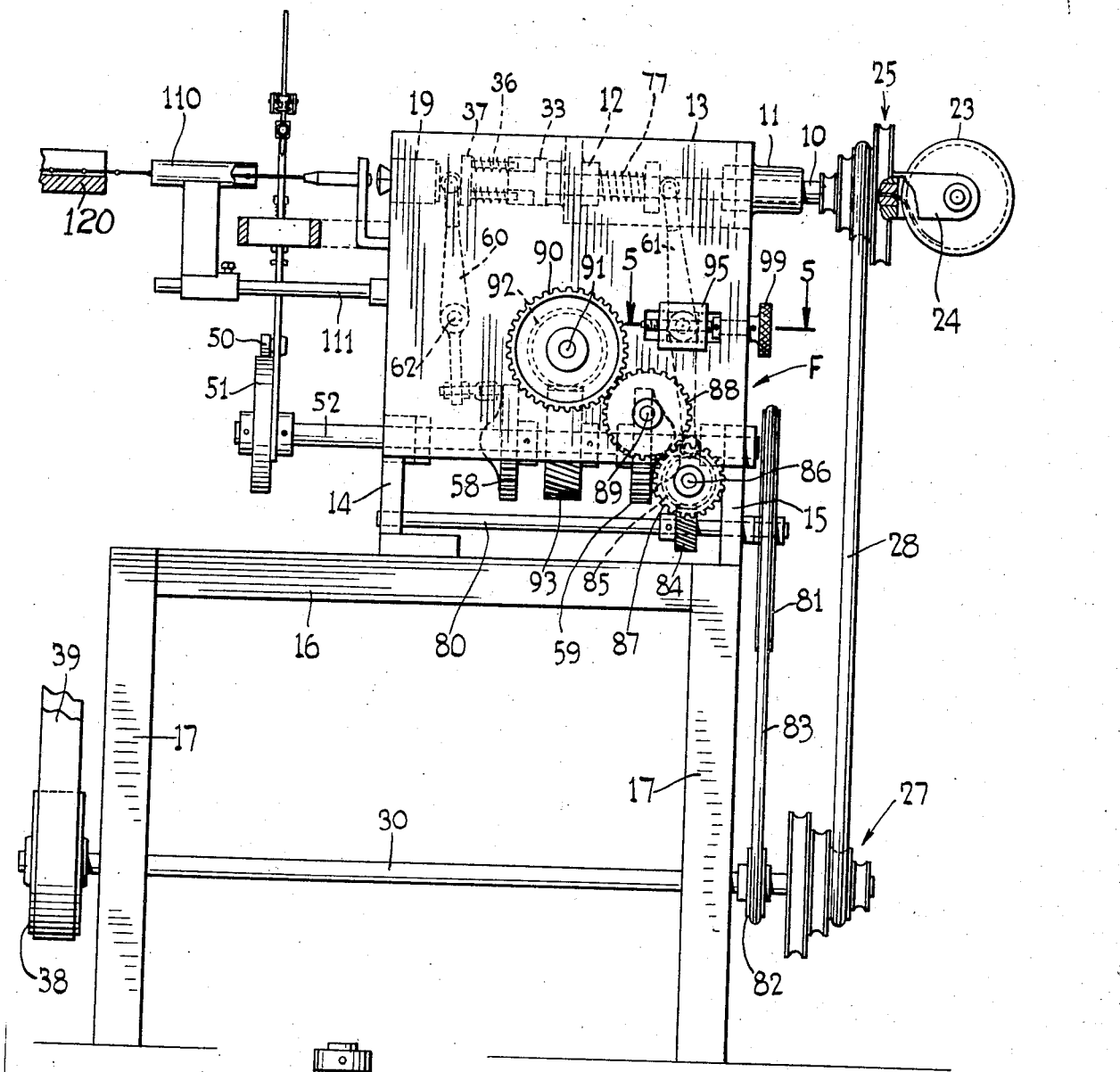
Figure 5:
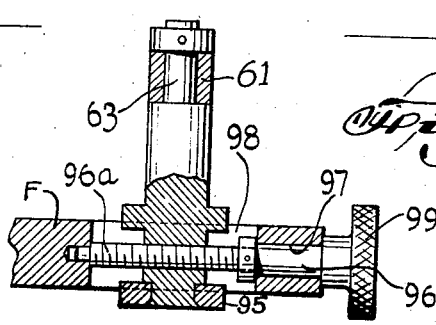
Fig. 5 is an enlarged part-sectional view taken substantially on the line 5—5 of Fig. 1.

My improved bead making process contemplates the use of a continuous wire of suitable material and size and comprises essentially the following steps:

The wire is rotated axially, and at intermittent predetermined intervals is moved in an axial direction. Between the times that the said wire is axially moved and while it is rotating, a portion of a glass rod member or a member of similar material which has been heated to a semi-molten or plastic state, is brought into intimate contact with the rotating wire. This causes the plastic glass material to adhere to the wire to be drawn off the rod and convoluted into a bead. When a sufficient amount of such plastic material has been thus drawn from the rod, the said rod is moved away from the wire to break the connection therebetween and a bead is thus formed on the wire. The wire is then moved axially so as to be in position for the making of another bead. Spaced from the first bead any desired distance the plastic portion of the glass rod is again brought into contact with the wire at the newly selected position to form a second bead and so on until any desired number of beads are formed. The wire with the beads thereon formed as above described, will then appear as in Fig. 7 of the drawings. After the beads have cooled they may be removed from the wire in any suitable manner. One method which I have found satisfactory is to stretch the wire longitudinally. This reduces the diameter of the wire, thus breaking its hold on the glass bead and permits sliding movement of the beads on the wire to remove the same therefrom from the ends of the wire.

Referring now in detail to the drawings I have therein illustrated a novel bead making apparatus constructed and arranged in accordance with my invention and adapted for use in the manufacture of beads from glass or other suitable similar material, and which may also be operated as to provide a continuous and automatic process.

My improved bead making apparatus comprises a hollow shaft 10, horizontally disposed and journaled for rotation in a pair of bearing members 11 and 12, the said bearing members 11 and 12 being in turn mounted on an upright wall 13 of a supporting frame F. The supporting frame F comprises the wall portions 14 and 15 which are adapted to rest upon a main support comprising the table member 16 and the leg portions 17. In accordance with my invention I provide a second hollow shaft 18 spaced from and in axial alignment with the hollow shaft 10 and mounted for rotational as well as axial movement in the following manner.

A suitable bearing member 19 is mounted on the frame wall 13, in which there is journaled for rotation, a hollow sleeve member 20. The said sleeve member 20 is provided with a pair of outwardly extending flanges 20a and 20b at opposite ends thereof which prevent axial movement thereof in the bearing 19, while permitting rotational movement. By means of a pair of keys 21 slidable in the keyways 22, the sleeve member 20 is caused to rotate whenever the shaft 18 is rotated. The keys 21 are so designed with respect to the keyways 22 that the shaft 18 may be axially slidably moved with respect to the sleeve 20 for purposes which will become apparent as the description proceeds.

The hollow shafts 10 and 18 are adapted to have slidably received in the openings 10a and 18a thereof respectively a wire W. The wire W is preferably of suitable thickness in accordance with the desired size of the opening in the bead ultimately to be made and of a material capable of withstanding a predetermined degree of heat.

A supply of the wire W is contained on a spool 23 rotatably mounted on a forked bracket 24, the said bracket 24 being in turn fixed to a multiple pulley member 25 for rotation therewith, the pulley 25 being in turn fixed to the hollow shaft 10 for rotation therewith.

It is thus seen from the above described construction that when the shaft 10 is rotated, the spool 23 will rotate therewith to cause axial rotation of the wire W within the openings 10a and 18a of the hollow shafts 10 and 18 respectively.

The following means are employed for causing rotational movement of the hollow shaft 10.

Journaled in suitable bearings 26 attached to the legs 17 is a horizontally disposed main driving shaft 30 on which there is mounted for rotation therewith a multiple pulley 27 in alignment with the pulley 25 and interconnected therewith by a belt 28. The main driving shaft 30 may be driven from any suitable source of power, such as a motor (not shown), through a pulley 38 fixed to the said shaft 30 and a belt 39. To facilitate the axial rotational movement of the wire W there is provided a cone shaped chuck member 31 mounted at one end of the hollow shaft 18 for movement therewith and designed to frictionally grip the wire W when the shaft 18 is axially moved in the direction of the arrow 32 to cause the tapered surface of the chuck to contactively engage the sleeve 20 as clearly shown in Fig. 6 of the drawings. The following means are provided for causing the hollow shaft 18 to rotate simultaneously with the hollow shaft 10.

A clutch member 33 is fixedly attached to the hollow shaft 10 for rotation therewith by any suitable means, such as, for example, the set screw 34. The said clutch member 33 is provided with a pair of grooves 35 extending inwardly from the periphery thereof and adapted to slidably receive therein a pair of correspondingly positioned pins 36, the said pins 36 being in turn fixedly attached to a cooperating clutch member 37 rigidly attached to the hollow shaft 18 for rotation therewith.

The wire W projects beyond the chuck 31 and is passed through a wire supporting member 40 attached to the frame F from whence it projects a predetermined distance with respect to the position of the material from which the bead is to be made. Such material is shown in the drawings as a glass rod 41, but which it is understood may be of any other suitable form.

In accordance with my invention as hereinbefore described, I provide the following means for supporting the glass rod 41, heating a portion of the said rod to plasticize the same and bringing the plastic portion thereof into intimate contact with the rotating wire W to form a bead.

The glass rod 41 is mounted in a supporting arm 42 so that the tip 41a thereof is out of contact with and slightly spaced from the wire W. The said rod 41 may be held in position by a brake device 43 having an adjusting set screw 44 to regulate the amount of force necessary to axially move the rod against the frictional force of the brake 43. A gas burner 45 of any suitable design is supported on a bracket 46 in such position as to throw a flame directly at the tip 41a of the rod 41 when the said rod tip 41a is in its dotted-line lowered position as shown in Fig. 4 of the drawings. The heat of the flame will plasticize the said tip 41a to cause the same to flow toward the wire W to contactively engage the same and form a bead as hereinbefore described. When sufficient material has been drawn off the rod to form a bead, the rod 41 is then moved to its full-line position as shown in Fig. 4. The gas burner 45 may be supplied with gas from any suitable source of supply through a supply pipe 47 and may be controlled by a valve 48. It is noted that the above described flame is so directed as not to affect the wire W, thus preventing sagging or breaking of the wire. The above described manner of feeding the glass rod may be done by hand, if desired or it may be accomplished automatically in accordance with my invention. To this end I provide a cam roller 50, rotatably mounted on the arm 42 and designed to ride upon the rim of a suitably designed cam 51. The cam 51 is mounted on a cam shaft 52 for rotation thereof, the said shaft 52 being in turn journaled in the bearings 53 and 54 mounted on the frame F. To retain the arm 42 in upright position and at the same time to guide the same in its movement, there is provided a slotted aperture 55 in the lower end of the arm 42, in which the shaft 52 is received, to permit vertical reciprocal movement of the said arm 42. The said arm 42 also slidably passes through an opening 56 in the bracket 46.

As hereinbefore described, after a bead has been made, the wire is automatically moved axially for a predetermined distance so that it will be in proper position for the making of a second bead, after which it is again axially moved to be in position for a third bead and so on until any desired number of beads are manufactured. I have provided the following mechanism for effecting such intermittent axial movement of the wire which is so synchronized with respect to the movement of the arm 42, caused by the cam 51 and roller 50, that the wire W will be axially advanced while the glass rod 41 is in its upper or full-line position (see Figs. 4 and 7) after which the rod tip 41a will then be automatically lowered into the path of the flame issuing from the gas burner 45 and after being heated thereby to plastic state, brought into contact with the rotating wire W.

Mounted on the cam shaft 52 for rotation therewith are the cams 58 and 59. A pair of levers 60 and 61 are rotatably mounted on the pivots 62 and 63 respectively supported by the wall 13 of the frame F.

Mounted at one end of the lever 60 for movement therewith is a bracket 64 in which there is rotatably mounted a cam roller 65 adapted to cooperate with the cam 58. Rotatably mounted at one end of the lever 61 is a cam roller 66 designed to cooperate with the cam 59. The opposite end of the lever 60 from that of the roller 65 is provided with a forked portion 60a, the prongs of which straddle the shaft 18. The forked portion 60a is provided with a pair of abutment members 67 which are designed to be adjacent to and abut the member 37 as shown in Figs. 2 and 6 of the drawings. Similarly the lever 61 is provided with a forked portion 61a the prongs of which straddle the shaft 10. The forked portion 61a is provided with a pair of abutment members 68 which are designed to lie adjacent to and abut a collar member 69 mounted on the shaft 10.

In accordance with my invention the cams 58 and 59 are so synchronized with respect to the levers 60 and 61 that when the glass rod 41 is away from and out of contact with the wire W, the said wire will be axially moved into a position for the making of another bead in the following manner.

When the shaft 52 is rotated, the roller 66 in siding from the low to the high point of the cam 59, will cause the forked portion 61a of the lever 61 to rotate in a counter-clockwise direction (as viewed in Fig. 6) to slidably move the collar 69 on the shaft 10. Slidably mounted in the collar 69 is a plunger pin 70 resiliently held in frictional engagement with the wire W by a spring 71. A set screw 72 is provided to adjust the tension or pressure of the plunger 70 on the wire W, such tension being sufficient to frictionally grip the same so as to move the wire axially and to cause it to unroll from the spool 23, upon the above described movement of the collar 69, actuated by the cam 59. A slot 73 is provided in the shaft 10 to permit free movement of the pin 70. If desired the bottom end of the plunger pin 70 may be slightly cammed as shown to facilitate the gripping action in one direction.

My apparatus is so designed that at the same time that the lever 61 is about to start to advance the wire W, as just described, the forked portion 60a of the lever 60 is also caused to be rotated in a counter-clockwise direction by means of the cam 58 and roller 65, to permit the springs 75, surrounding the pins 36 to urge the shaft 18 to slidably move in an axial direction opposite to that shown by the arrow 32. This will cause the chuck 31 to be relieved of its compression force to thereby permit free sliding movement of the wire W therethrough. Upon continued rotation of the shaft 52 the roller 66 again will reach the low area on the cam 59 and the collar 69 will be restored to its original position shown in Fig. 6, by means of a spring 77 surrounding the shaft 10 and interposed between the bearing 12 and the sliding collar 69.

At the same time the roller 65 will have reached the high point on the cam 58 to cause the clutch member 37 and shaft 18 to move in the direction of the arrow 32 and against the action of the springs 75, and the chuck 31 will again have gripped the wire 31 for rotation therewith.

The following means are provided for causing the synchronous rotational movement of the cam shaft 52 from the main driving shaft 30.

Journaled in the supports 14 and 15 is an auxiliary shaft 80 which is driven from the main driving shaft 30 by means of a pulley 81 mounted on the shaft 80, and a pulley 82 on the shaft 30, the said pulleys being interconnected by a belt 83. Mounted on the shaft 80 for rotation therewith is a worm gear 84 in mesh with a similar gear 85 mounted on a shaft 86.

Mounted on the shaft 86 for simultaneous rotation with the gear 85 is a second gear 87 in mesh with a gear 88 mounted on the shaft 89. The gear 88 is also in mesh with a gear 90 mounted on the shaft 91. The shafts 86, 89 and 91 are supported by the frame F. Fixed to the said shaft 91 for simultaneous rotation with the gear 90 is a second worm gear 92 in mesh with a corresponding worm gear 93 mounted on the cam shaft 52 for rotation therewith.

It is thus seen from the above described construction that when the main driving shaft 30 is rotated, the auxiliary shaft 80 will be rotated through the pulleys 81 and 82 and the belt 83, the cam shaft 52 will be rotated through the chain of gearing 84, 85, 87, 88, 90, 92 and 93. At the same time the shaft 10 will be rotated through the pulleys 25 and 27 and the belt 28, while the shaft 18 may be simultaneously rotated with the shaft 10 by means of the cooperating clutch members 33 and 37 as hereinbefore described.

It is thus seen from the above described con- in connection with the drawings, that the amount of advance movement of the wire W, or in other words, the spacing between the beads B on the wire W is governed by the amount of oscillation of the fork portion 61a of the lever 61. Instead of mounting the pivot shaft 63 directly on the frame F, I mount the same for lateral sliding movement in a bracket 95, said bracket 95 being slidably mounted in the opening 98 in the frame F: adjustment of the bracket being effected by screw member 96 passing through an opening 97 in the frame F. The member 96 is provided with an enlarged knurled head 99 and abuts the wall of the opening 98 at the free end of threaded shank 96a. It is thus seen that when the head 99 is turned the pivot 63 will be moved laterally by means of the threaded shank 96a.

In accordance with my invention I also provide means whereby the glass rod 41 may be automatically fed a predetermined distance in a direction toward the wire W each time the said rod reciprocates to compensate for the amount that the rod has been shortened due to drawing off of the glass material from the rod 41 to make a bead.

As shown in Fig. 4 of the drawings, I provide a rigid arm member 100 having a suitable frictional clutch member 101 engaging the rod 41. The arm 100 is provided with an angularly bent portion slidably passing through an opening 102 in the support 46 and provided with a collar 103 at the lower end thereof. A spring 104 surrounding the arm 100 is interposed between the support 46 and a collar 105 fixed to the arm 100 for movement therewith.

As shown in Fig. 4a the clutch member 101 comprises a forked portion comprising the prongs 101a and 101b which are carried by the arm 100 and straddling the rod 41 and a frame 106 having openings 106a and 106a' through which the rod 41 is adapted to slidably pass. The frame 106 is supported on the prongs 101a and 101b by a pair of link members 107 and 107'. The said link members are rotatably mounted on the pivots 108 and 108' fixed to the frame 106. The outer ends of the links 107, 107' freely pass through openings 109 and 109a in the prongs 101a and 101b respectively. Surrounding the glass rod 41 and carried by the links 107, 107' is a brake member 112 of suitable braking material for frictionally holding the glass rod 41 when pressure is applied thereon by the links 107, 107'. The openings 109 and 109a are so designed with respect to the said links 107, 107' that the brake member 112 may slip slightly only in an upward direction and when the said brake member 112 is moved in a downward direction, the rod 41 will move with it.

It is thus seen that each time the rod 41 is moved downwardly from its full-line position to its dotted-line position in Fig. 4 an abutment 114 on the arm 41 is so positioned that it will strike the collar 103 to cause the arm 100 to move downwardly with it to cause the clutch 43 to slip and permit the rod 41 to move downwardly for a predetermined slight distance, so that when the rod 41 is in its lowered position, it will be sufficiently near to the flame and wire W to become plasticized to form a bead.

Upon upward movement of the arm 42 to restore the rod 41 to its uppermost, or full-line position the abutment member 114 will move away from the collar 103 and the arm 100 will be restored to its original position by the action of the spring 104, the brake member 112 permitting the upward movement of the arm 100 with respect to the glass rod 41 for reasons above described.

A collar 115 fixed to arm 100 and normally abutting the lower surface of the bracket 46 limits the upward restoring movement of the arm 100.

A set screw 116 may be employed for attaching the collar 103 to the arm 100 so that the said collar 103 may be adjustably positioned with respect to the abutment member 114.

The beads B, after being formed as above described may be passed through a cooling cylinder 110 suitably slidably supported on a rod 111 fixed to the frame F, and after emerging therefrom may slidably rest upon a suitable table surface 120 after which the wire may be cut at any desired lengths.

It will thus be seen that there is provided an apparatus and a method for making beads in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having described my invention, what I claim and desire to secure by Letters Patent is:

1. In an apparatus for making beads wherein thermoplastic material is heated to a plastic condition and brought into contact with a length of wire unrolled from a spool and adapted to be rotated on its longitudinal axis by rotating the said spool, so as to draw off a sufficient quantity of material to form a bead—the combination of a frame, a first hollow shaft supported by said frame, a second hollow shaft supported by said frame and in axial alignment with said first hollow shaft, said length of wire passing through said first and second hollow shafts, means for rotating said first shaft with said spool, a coupling causing simultaneous rotation of said first and second shafts, said coupling additionally permitting relative axial movement between said first and second shafts.

2. An apparatus for making beads according to claim 1 in which wire gripping means are carried by said second shaft to facilitate axial rotation of said wire, said wire gripping means being rendered effective and ineffective by the said relative axial movement between said first and second shafts.

3. An apparatus for making beads according to claim 1 in which wire gripping means are carried by said second shaft to facilitate axial rotation of said wire, said wire gripping means being rendered effective and ineffective by the said relative movement between said first and second shafts, and in which means are employed for intermittently advancing said length of wire in an axial direction, said last named means comprising a collar slidably mounted on said first shaft, a plunger pin carried by said collar and resiliently held in frictional engagement with said wire, said pin being cammed so that it will grip the said wire to force the axial movement of said wire forwardly when the said collar is slidably moved forwardly and will ride freely over said wire when the said collar is slidably moved in the opposite direction, spring means for normally urging the movement of said collar in said opposite direction and means for intermittently causing the said forward sliding movement of said collar against the action of said spring means.

4. An apparatus for making beads according to claim 1 in which means are employed for intermittently advancing said length of wire in an axial direction, said last named means comprising a collar slidably mounted on said first shaft, a plunger pin carried by said collar and resiliently held in frictional engagement with said wire, said pin being cammed so that it will grip said wire to force the axial movement of said wire forwardly when the said collar is slidably moved forwardly and will ride freely over said wire when said collar is slidably moved in the opposite direction, and means for intermittently causing the said forward sliding movement of said collar, said last named means comprising a lever rotatably mounted on said frame, said lever being caused to oscillate by a cam rotatably mounted on said frame.

5. An apparatus for making beads according to claim 1 in which means are employed for intermittently advancing said length of wire in an axial direction, said last named means comprising a collar slidably mounted on said first shaft, a plunger pin carried by said collar and resiliently held in frictional engagement with said wire, said pin being cammed so that it will grip the said wire to force the axial movement of said wire forwardly when the said collar is slidably moved forwardly and will ride freely over said wire when the said collar is slidably moved in the opposite direction, means for intermittently causing the said forward sliding movement of said collar, said last named means comprising a lever rotatably mounted on said frame, a third shaft supported by said frame, a cam on said third shaft for rotation therewith, one end of said lever being associated with said collar, the other end of said lever being cooperatively connected to said cam whereby the rotation of said third shaft will cause oscillation of said lever to intermittently slide said collar forwardly and means for rotating said third shaft.

6. An apparatus for making beads according to claim 1 in which wire gripping means are carried by said second shaft to facilitate axial rotation of said wire, said wire gripping means being rendered effective and ineffective by the said relative axial movement between said first and second shafts, and a lever mounted on said frame, said lever being adapted to oscillate to cause intermittent relative axial movement between the said first and second shafts.

7. An apparatus for making beads according to claim 1 in which wire gripping means are carried by said second shaft to facilitate axial rotation of said wire, said wire gripping means being rendered effective and ineffective by the said relative axial movement between said first and second shafts, and in which means are employed for intermittently advancing said length of wire in an axial direction, said last named means comprising a collar slidably mounted on said first shaft, a plunger pin carried by said collar and resiliently held in frictional engagement with said wire, said pin being cammed so that it will grip the said wire to force it to move axially forwardly when the said collar is slidably moved forwardly and will ride freely on said wire when the said collar is slidably moved in the opposite direction, means for causing the said forward sliding movement of said collar, said last named means comprising a lever rotatably mounted on said frame, a third shaft supported by said frame, a cam on said third shaft for rotation therewith, one end of said lever being associated with said collar, the other end of said lever being cooperatively connected to said cam whereby rotation of said third shaft will cause oscillatory movement of said lever to intermittently slide said collar forwardly, and in which means are employed for causing the said relative axial movement of said first and second shafts, said last named means comprising a second lever rotatably mounted on said frame, a second cam on said third shaft for rotation therewith, one end of said second lever being associated with said coupling, the other end of said second lever being cooperatively connected to said second cam to cause intermittent operation of said coupling, the oscillatory movement of said levers being synchronized so that the said gripping means will be rendered ineffective during the time that the said wire is being axially forwardly advanced.

PETER SYNEK.